United States Patent [19]

Jocteur

[11] 4,234,531
[45] Nov. 18, 1980

[54] METHOD FOR EXTRUDING A CROSS-LINKED MATERIAL

[75] Inventor: Robert Jocteur, Moret sur Loing, France

[73] Assignee: Societe Industrielle de Liaisons Electriques-Silec, Paris, France

[21] Appl. No.: 8,574

[22] Filed: Feb. 1, 1979

[30] Foreign Application Priority Data

Feb. 2, 1978 [FR] France .................. 78 02942

[51] Int. Cl.³ .............................................. B29F 3/10
[52] U.S. Cl. ................................... 264/174; 264/211; 264/236; 425/97; 425/197; 425/376 R
[58] Field of Search ........................ 264/24, 230, 174; 425/97, 376 R, 197–199, 461

[56] References Cited

U.S. PATENT DOCUMENTS

| 2,393,452 | 1/1946 | Barley et al. | 425/197 |
| 2,443,289 | 6/1948 | Barley | 425/197 |
| 2,539,128 | 1/1951 | Gray | 425/198 |
| 2,911,676 | 11/1959 | Henning | 425/197 |
| 3,275,731 | 9/1966 | Kosinsky | 264/211 |
| 3,800,019 | 3/1974 | Parseg et al. | 264/174 |
| 3,930,782 | 1/1976 | Bigland | 425/376 |
| 4,091,064 | 5/1978 | Kakinama et al. | 425/113 |
| 4,136,132 | 1/1979 | Poole | 264/211 |
| 4,155,690 | 5/1979 | Checkland et al. | 425/113 |

FOREIGN PATENT DOCUMENTS 2331986 6/1973 Fed. Rep. of Germany .
2445698 4/1976 Fed. Rep. of Germany .

Primary Examiner—Jay H. Woo
Attorney, Agent, or Firm—Cushman, Darby & Cushman

[57] ABSTRACT

A method of extruding a cross-linked material, more particularly an insulating cross-linked material around an electrical cable. In an extrusion machine comprising a housing terminated with an extrusion head and provided with a filtering means adjacent the outlet end of said housing, the cross-linkable product is fed without addition of a cross-linking agent, said cross-linking agent being first introduced in said cross-linkable material downstream said filtering means. The cross-linkable material is kept in the housing at an elevated temperature to be in a fluid state, the cross-linking agent being introduced at a temperature slightly lower than its reaction temperature, whereby the extrudate may be at a temperature near the maximum temperature admissible for the extrusion of said material.

11 Claims, 6 Drawing Figures

METHOD FOR EXTRUDING A CROSS-LINKED MATERIAL

BACKGROUND OF THE INVENTION

1. Field of the Invention

This invention relates to a method and an apparatus for extruding a cross-linked material and more particularly to a method and an apparatus for extruding a cross-linked insulating material around an electric cable.

2. Description of the Prior Art

It is known in the art to make use as insulation for electrical cables of materials which are chemically cross-linked with peroxides, said cross-linkable materials being for instance polyethylen or its derivates.

FIG. 1 schematically shows an extrusion machine for depositing a cross-linkable material on an electric cable.

In the known processes, the housing of the extrusion machine 1 comprises a feed screw rotatingly driven by a motor 2 for feeding a desired mixture 3 from a hopper 4 toward the downstream end 5 of the housing and toward the extruding head 6. A cable 7 is first coated with the cross-linkable material 8 before being forwarded toward the cross-linking oven 9.

It will be appreciated that, according to an important feature of the known apparatuses, in the feeding hopper 4 of the extrusion machine are simultaneously introduced all the materials provided for obtaining the cross-linked insulating material, i.e. the cross-linkable material, for instance polyethylen or its derivates, and the cross-linking agent, typically an organic peroxide. Accordingly, the temperature inside the housing of the extrusion machine has to be kept at relatively low values so as to prevent untimely cross-linking in the housing of the extrusion head, otherwise grains or heterogeneous particles would be present in the extruded materials. An additional requirement is that the time the materials while being forwarded remain in the housing and in the extrusion head be relatively short. It results therefore that the downstream filter or screen 10 of the extrusion machine cannot be as fine as required, and must be eventually suppressed. Thus, a very fine filter promotes the formation of dead zones in the housing of the extrusion machine within which a pre-cross-linking may occur.

Accordingly, a permanent drawback of the known processes resides in the fact that the cross-linkable material cannot be efficiently filtered after the outlet of the extrusion machine. Such a filtering is however an important requirement. As a matter of fact, the cross-linkable material is set in the hopper 4 in the form of a powder or granulates, said powder or granulates being generally obtained by cutting the cross-linkable material available in the form of rods or bars. Even if the cross-linkable material has been purified before being cut or minced, it results from the cutting or mincing steps that small metallic particles are mixed into the cross-linkable material. The ulterior presence of such small metallic particles, of a size for instance between 50 to 100 $\mu$m may be irremediably prejudiciable to the good insulation of an electric cable. For instance, it can be said that the presence of a single metallic particle of a size of about 100 $\mu$m in an amount of 1.5 tons of polyethylen necessary for insulating a cable of about 800 m in length is sufficient to be prejudiciable to a convenient operation of the cable. It results therefrom that, in the known processes, the thickness of the insulating liner has to be heavily dimensioned.

Another noticeable drawback of the known processes results in the fact that, as above mentioned, the temperature inside the housing of the extrusion machine has to be kept lower than the cross-linking temperature. Said temperature may be for instance about 130° C. On the other hand, to carry-on efficiently cross-linking, the temperature must be raised at a value of about 160° C. It is thus necessary, in the known apparatus, to achieve said raising in temperature downstream the extrusion dye, whereby it is necessary to increase the length of the cross-linking oven 9. It results therefrom an increased bulking of the fabrication plants.

SUMMARY OF THE INVENTION

Objects of the Invention

Accordingly, it is an object of this invention to provide a novel method and a novel apparatus for extruding a cross-linked insulating material which obviate the above mentioned drawbacks.

Thus, another object of the invention is to provide a novel method of extruding a cross-linked insulating material wherein the insulating material is substantially at a temperature slightly lower than the cross-linking temperature when leaving the extrusion dye.

A further object of the invention is to provide a novel method of extruding a cross-linked material wherein the cross-linkable material may be efficiently filtered within the housing of the extrusion machine.

In order to meet these objects and others, there is provided a method of extruding continuously in a closed environment a cross-linked insulation material, which comprises the steps of:

forwarding a cross-linkable material through an extrusion machine which is heated at a temperature near the maximum temperature admissible for the cross-linkable material so as to bring said material to the most fluid state, said extrusion machine being provided adjacent its downstream end with a filtering means;

introducing between said filtering means and the extrusion dye of the extrusion machine a cross-linking agent at a temperature slightly lower than the reaction temperature for said agent; and mixing conveniently the cross-linkable material and the cross-linking agent before they pass through the extrusion dye, the extrudate being at a temperature near the maximum temperature admissible for extruding said material.

BRIEF DESCRIPTION OF THE DRAWINGS

Other objects, features and advantages of the invention should become apparent from the following description, taking in conjunction with the appending drawings in which.

DETAILED DESCRIPTION OF THE DRAWINGS

Figure 1:
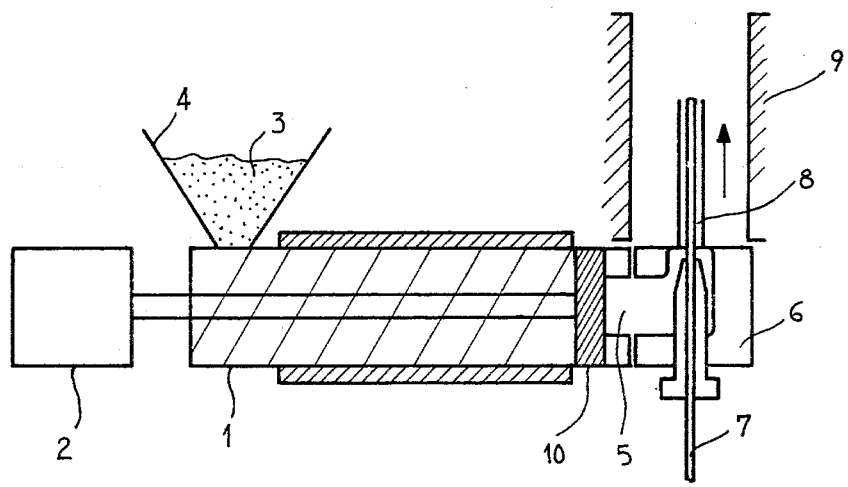
FIG. 1 is a view of a prior art extrusion machine.

FIG. 1, which illustrates an extruding device of the prior art and its drawbacks has been discussed hereinabove.

Figure 2:
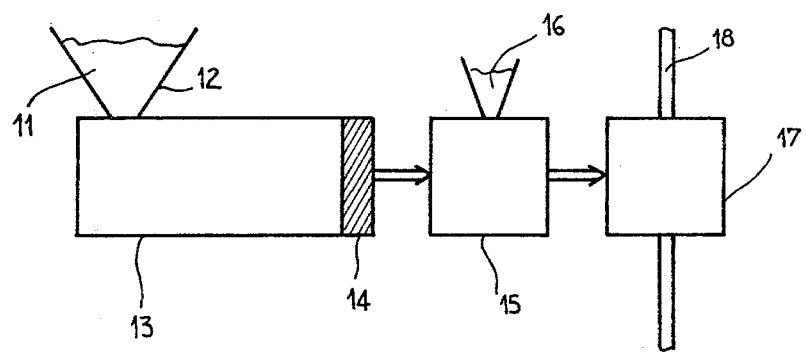
FIG. 2 illustrates, as a block diagram, the method of the invention.

FIG. 2 shows, a block diagram, the method of the invention. A cross-linkable material 11 is introduced from an inlet hopper 12 into the housing of an extrusion machine 13 (which is analogue to the extrusion machine 1 shown in FIG. 1). However, according to an important feature of the invention, the starting material 11 in the hopper is free of cross-linking agent such as a peroxide, and only consists in a cross-linkable material in the form of powder or granulates, for instance polyethylen, with eventually a cross-linking inhibiting agent. Accordingly, a very efficient filtering means 14 capable of retaining small solid particles having sizes ranging between about 50 $\mu$m and 100 $\mu$m may be positioned across the outlet end of the housing of the extrusion machine 13 since, according to the method of the invention, there is no risk of cross-linking within the body of the housing of the extrusion machine 13 or within the dead zones adjacent the filtering means 14. Said filtering means advantageously consists in a screen frame carrying filtering elements. On the other hand, the temperature of the cross-linking material within the housing of the extrusion machine 13 may be considerably raised, whereby providing an excellent fluidity of the cross-linking material and, accordingly, an efficient filtering thereof. The material leaving the filter 14 passes through an injection device 15 where is injected a cross-linking agent such as an organic peroxide 16. Said injector 15 realizes, on one hand, the injection of the cross-linking agent 16 within the cross-linking material and, on the other hand, a good blending of said material and of said agent, either by diffusion or through blending means as it will be detailed hereinbelow. The mixture from the injector 15 is ulteriorly fed in a conventional manner to an extrusion dye 17 for depositing the insulating material onto, e.g. around an electrical cable 18.

It is thus achieved the first advantage of the invention, which consists in an efficient filtering of the cross-linkable material just before it is applied onto the electrical cable to be insulated. It will be further noted that, since the cross-linking agent 16 is admixed to the cross-linking material just before the entry in the extrusion head 17, the temperature of the mixture may be kept at a relatively high value, substantially equal to the cross-linking temperature, due to the very short path of the mixture between the injection station 15 and the extrusion head 17. It is thus obtained a noticeable reduction in the length of the cross-linking oven which is provided at the downstream end of the manufacturing line.

Figure 3:
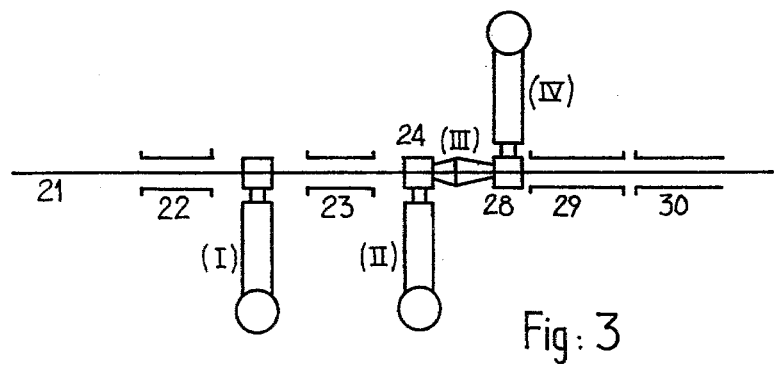
FIG. 3 schematically shows a manufacturing line for manufacturing insulated cables.

FIG. 3 schematically illustrates said cable manufacturing line, which comprises:

an extrusion machine I for extruding a partially conducting material such as a conducting polyethylen onto the core of an electrical cable 21;

an extrusion machine II for extruding a cross-linkable insulating material such as polyethylen (PE) which does not contain any cross-linking agent such as peroxide;

an injection device III for injecting and diffusing the cross-linking agent into the cross-linkable material; and an extrusion machine IV for extruding an outer layer of a conducting polyethylen on the insulating layer.

The core of the electrical cable 21 passes successively through a pre-heating oven 22, through the extrusion head (I) where it is coated with the layer of conducting polyethylen (PE), through an oven 23 for maintaining its temperature, and through the extrusion head of the extrusion machine (II). According to the invention, the insulating PE is introduced within the extrusion machine (II) with or without an anti-oxidizing agent but without peroxide.

The insulating material is thus forwarded through the angle head 24 and, before being applied onto the cable, through the device (III) where successively occur injection and diffusion of peroxide. The shapes and dimensions of the device (III) are determined so as the peroxide may conveniently diffuse into the bulk of the insulating material. As a specific example, the temperature within the housing of the extrusion machine (II) may be chosen about 200° C., the temperature at the level of the injection device (III) about 150° C. and the temperature within the outlet cross-linking oven 29 between about 200° and 300° C. Reference numeral 30 designates a cooling means and reference numeral 28 the extrusion head of the extrusion machine (IV) for extruding the conducting polyethylen, as above mentioned.

Figure 4:
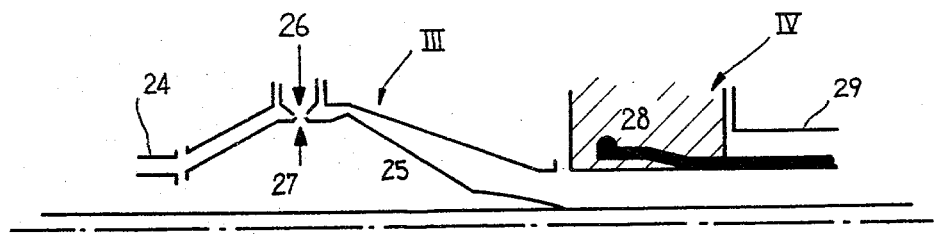
FIG. 4 schematically shows an embodiment of an injector according to the invention.

FIG. 4 is a view, at a larger scale, of an embodiment of the injection device (III) for the cross-linking agent. The outlet of the angle head 24 shown in FIG. 3 is connected with said injection device (III).

Injection is generally caused within a throttling zone by means of injectors 26 arranged on an annular ring within the injection device. The injectors may be eventually provided with obturating valves for preventing entry of the extruded material into the injectors. Also eventually, an additional injection may be obtained with an inner ring of injectors 27 arranged inside the machine. Then, the insulating material passes through a diffuser of a convenient shape 25, is shaped and passed through a head 28 of the extrusion machine (IV) which deposits the outer layer of conducting PE onto the insulated cable. In some cases, diffusion of the peroxide-based mixture within the device 25 may be not sufficient to insure a good homogeneity of the extruded material. An additional homogeneization may be obtained by providing within the diffuser 25 baffles (not shown), or, more generally, deflecting means causing the streams of the blended material to interpenetrate. In this case, a cooling device may be provided for preventing exaggerated raising of the temperature of the material.

Figure 5:
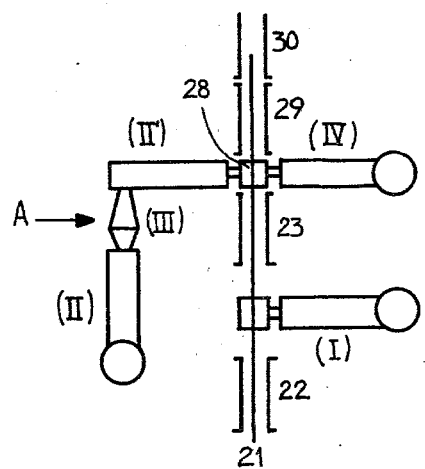
FIGS. 5 and 6 schematically show a production line for insulating an electric cable including other embodiments of the present invention.
Figure 6:
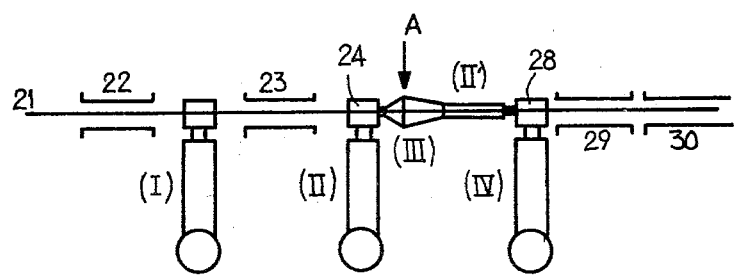

In another embodiment shown in FIGS. 5 and 6, the device for causing the peroxide to diffuse into the cross-linkable material is adapted to promote a more important mechanical action. Therefore, use is made of an additional extrusion machine (II') having a reduced length. The peroxide-based mixture is injected at A between the two extrusion machines (II) and (II') or in the feeding zone for the feeding screw of the extrusion machine (II'). The arrangement shown in FIG. 6 suppresses the dead zones within the flowing but requires an extrusion machine (II') provided with an hollow feeding screw through which the core 21 of the electrical cable may pass.

In any case, the composition of the injected mixture is of importance for insuring a convenient functioning of the production plant. It is desirable, when the production line is started, that the extrusion is first carried-on without peroxide, whereby allowing easy metering and setting of the line without the risks of untimely cross-linking occurring. If the machine is provided with valved injectors, said operation may be easily carried on by stopping the feeding of the mixture to be injected. Otherwise, it is necessary to first inject during the starting sequence a neutral liquid which does not contain any peroxide, for instance an oil compatible with the polyethylen, such as a paraffinic oil. When the setting or the metering is achieved, the peroxide is continuously injected in a permanent duty. Said peroxide may be in a pure state, blended with a carrying oil of a same nature that the oil utilized during the starting procedure and/or blended with a retarder such as an anti-oxidant, for retarding the cross-linking reaction. The metering of said retarder permits to control the reaction velocity of the peroxide. It will be appreciated that injection of peroxide may be set at any moment, whereby providing a smooth operation permitting to control the risks of formation of "grains" in the diffuser. Temperatures of the liquid and of the walls of the injection device are controlled. Said temperatures are determined so as the cross-linking reaction is not initiated before the mixture enters the head 28 of the extrusion machine (IV).

At the outlet of the extrusion head 28, the insulated cable passes through the cross-linking zone 29 which may consist in one among the known devices thereto, but which preferably carries-on the dry vulcanization method, either in a gaseous atmosphere or in a long dye. Whatever the process is, the length of the cross-linking zone is considerably reduced with respect to the length of the known cross-linking devices. Said length may be divided by a factor two owing to the elevated temperature of the extruded insulating material at the outlet of the extrusion head 28. With a cross-linking agent such as dicumyl peroxide, said temperature reaches for instance 150° to 160° C., when in the known processes said temperature does not go beyond 130° C. Decomposition of the peroxide, more particularly in the vicinity of the cable core which has been previously advantageously pre-heated, is accordingly more rapidly initiated and the cross-linking of the insulating material is obtained in a time lesser than in the known processes.

It will be now indicated various materials which can be advantageously utilized in the method of the invention, but it will be appreciated that said materials are only enonciated as examples and that all the materials which are presently known and which are useful for insulating an electrical cable with a cross-linking insulator may be utilized in the method of the invention.

The cross-linking material may advantageously be polyethylen or its derivates.

The cross-linking agent which is injected after the cross-linkable material has been filtered may be an organic peroxide such as a dicumyl peroxide or a blend of organic peroxides capable of promoting cross-linking of the polyethylen and capable of being incorporated in a liquid state in the polyethylen, either because the peroxide or the mixture of peroxides is liquid at the ambiant temperature, or because the peroxide or the mixture of peroxides is heated at a temperature higher than its smelting point, or because the peroxide or the mixture of peroxides is in solution in a carrying liquid such as paraffinic oil; it will be further recalled that, at the beginning of the insulating process, as above mentioned, the carrying liquid may be injected alone for achieving various settings. It is also possible to add to the mixture for the production of the cross-linked insulating material one or more pre-cross-linking inhibitors or retarders either upstream, at the level of the cross-linkable material, or at the level of the injection of the cross-linking agent.

The present invention is not limited to the embodiments shown, but is on the contrary susceptible of modifications and variants which will appear to those skilled in the art.

What I claim is:

1. A method for continuously extruding in a closed environment an insulating material cross-linked by the separate addition of a cross-linking agent, which method comprises the following steps:
    (1) passing a cross-linkable insulating material through an extrusion machine provided adjacent its outlet end with a filtering means and at said outlet end with an extrusion head, said extrusion machine being heated to a temperature between about 200° and 220° C., said temperature being about the maximum temperature admissible for said material, so as to bring said material in a substantially fluid condition;
    (2) cooling the thus filtered material to a temperature between about 140° and 150° C. which temperature is slightly lower than the reaction temperature of the cross-linking agent;
    (3) injecting said cross-linking agent into said thus cooled material; and
    (4) conveniently mixing said cross-linkable material and said cross-linking agent; and thereafter
    (5) elevating the temperature of the mixture of step (4) to a temperature about the maximum temperature admissible for the extrusion of said extrudate before it leaves said extrusion head.

2. The method of claim 1, wherein a cross-linking retarding agent is initially added to said cross-linkable material.

3. The method of claim 1, wherein a cross-linking retarding agent is initially added to said cross-linking agent.

4. The method of claim 1, wherein said cross-linking agent is in solution in a carrying liquid.

5. The method of claim 1, wherein said cross-linkable material is polyethylene or its derivates.

6. The method of claim 1, wherein said cross-linking agent is an organic peroxide such as dicumyl peroxide.

7. The method of claim 5, wherein said cross-linking agent is an organic peroxide such as dicumyl peroxide.

8. The method of claim 4, wherein said carrying liquid is a paraffinic oil.

9. A method for continuously extruding a cross-linked insulating material in an extrusion machine comprising a housing and an extrusion head, said method comprising the steps of: introducing a cross-linkable material within said housing, forcing said material towards said extrusion head while heating same at a first elevated temperature, filtering said thus heated material at said first temperature, cooling said thus filtered material at a second temperature lower than said first temperature, injecting into said thus cooled material a cross-linking agent, and heating the thus obtained mixture at a third temperature higher than said second temperature and extruding said mixture.

10. The method of claim 9, wherein said first temperature is about 200° C. and said second temperature being about 150° C.

11. The method of claim 10, wherein said third temperature is between about 200° and about 230° C.

* * * * *